United States Patent Office 3,286,357
Patented Nov. 22, 1966

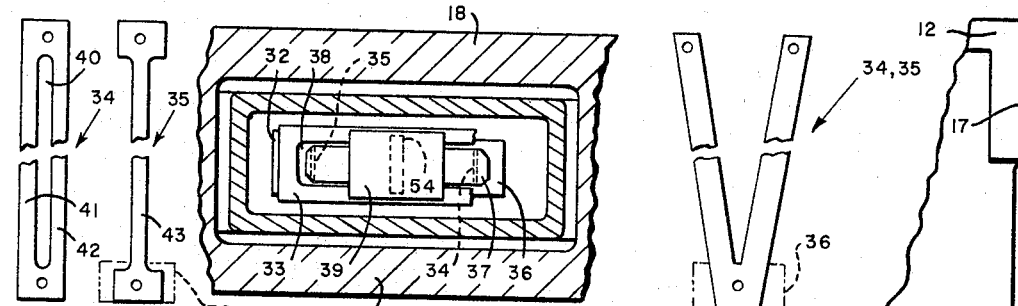
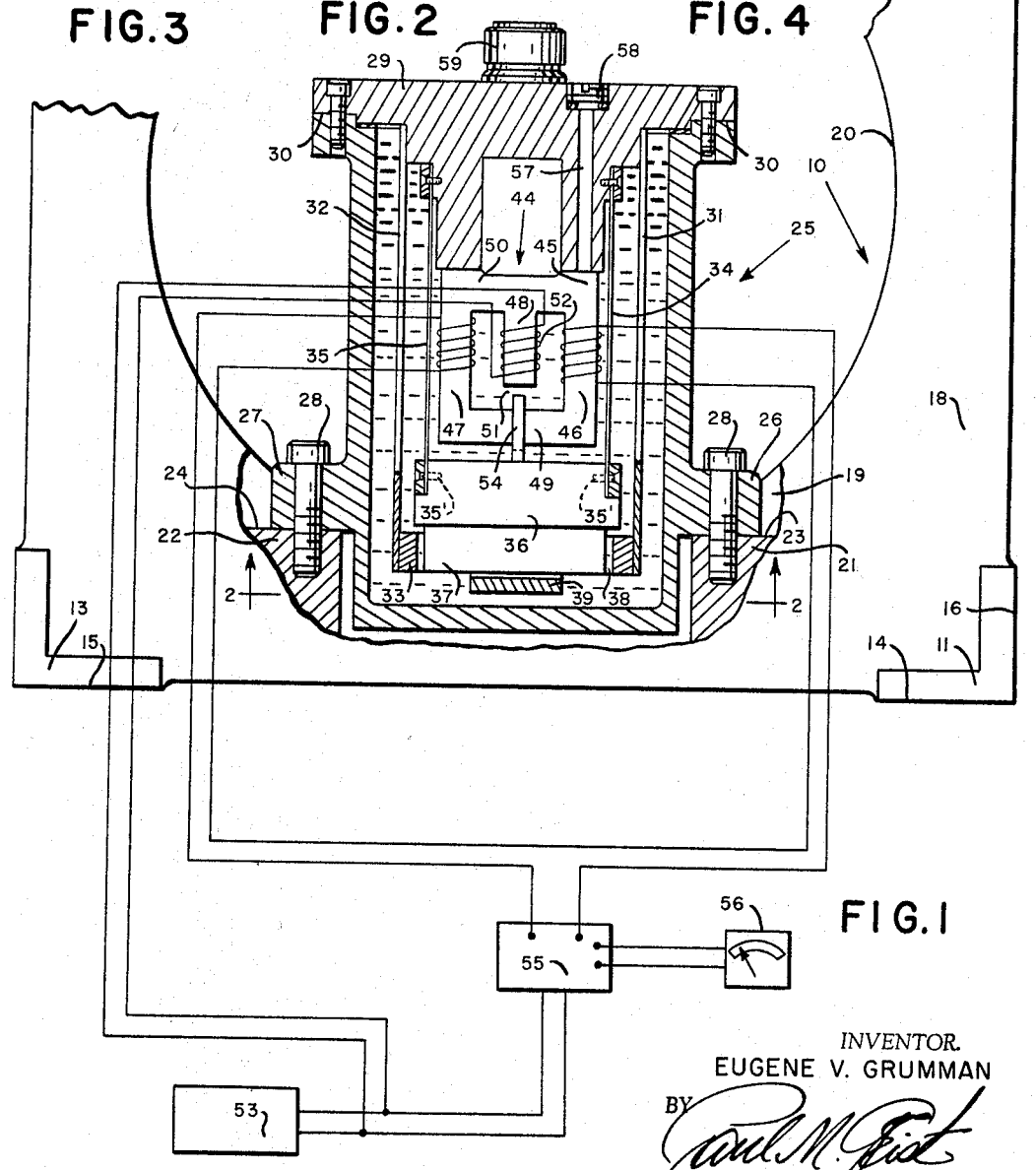

3,286,357
ELECTRONIC LEVEL
Eugene V. Grumman, Fairfield, Conn., assignor to The Bullard Company, Bridgeport, Conn., a corporation of Connecticut
Filed Oct. 18, 1963, Ser. No. 317,378
3 Claims. (Cl. 33—215)

This invention relates to levels, and particularly to an improved level capable of measuring extremely small deviations from a true horizontal or vertical.

In the past, deviations from horizontal or vertical have been measured primarily by bubble levels. Such levels have a sensitivity range of between about 4 to 5 seconds of arc per graduation and are extremely sensitive to temperature differentials such that body heat often produced inaccurate readings.

With the advent of modern highly sophisticated machine tools, it has become necessary to know precisely the characteristics of the tool. This requirement necessitates as a measuring instrument, a level with a high response coupled with extreme accuracy.

Electronic levels have been produced but they, for the most part, employ a capacitance circuit that is varied by movement of a bubble. Such known electronic levels are expensive and their capability is in the order of about two seconds of an arc. Known pendulum levels are not too satisfactory since they require secure locking means for the pendulum during the time the level is in transit.

The principal object of this invention is to provide a level including an electronic pendulum-type transducer which will have a capability in the order of about one-half second of arc or less.

Another object of the invention is to provide a level including such a transducer which will respond to a setting much more rapidly than bubble levels.

Still another object of the invention is to provide a level including such a transducer involving a pendulum arrangement which will measure values of one-half second of arc or less.

Still another object of the invention is to provide a level including such a pendulum type transducer which will require no locking of the pendulum during the time the level is in transit.

Another object of the invention is to provide a level including such a transducer which will be unaffected by magnetism, stray voltages or stray currents.

Still another object of the invention is to provide a level including such a transducer which can read deviations from datum while a machine member supporting the level is in motion.

In one aspect of the invention, a frame, such as a Watt frame including precise right angular corners with the surfaces thereof on the same side of the frame in precise alignment, may rest on a horizontal surface or be held against a vertical surface, the deviation of which from horizontal or vertical is to be determined. The frame may be provided with an open interior having aligned supporting surfaces precisely parallel with the aligned surfaces of the square bottom corners of the frame.

In another aspect of the invention, a housing may be mounted on the supporting surfaces in the open interior, and it may include a removable top member having closable passage means communicating with the interior of the housing. The top member may include vertical strap means of relatively rigid construction and non-magnetic characteristics for rigidly supporting an elongated frame member of non-magnetic material and of rectangular outline between the lower ends of said strap means and at a point near the bottom of the housing.

In a still further aspect of the invention, the top member may also support spaced, transversely aligned, thin, non-magnetic strips between the strap means. Attached to the lower ends of said strips is a mass of non-magnetic material having a portion that passes through an opening in the frame member supported by the strap means with a small clearance between the inner surfaces of the frame member and the mass in the order of a few thousandths of an inch.

In still another aspect of the invention, the top member may also support a differential transformer between the strips supporting the pendulum, and a movable flux barrier may be connected to the pendulum for varying the magnetic flux distribution in the opposed legs of the differential transformer.

In still another aspect of the invention, the pendulum supporting strips may be in the form of a V with the crotch fixed to the pendulum mass at its center of gravity.

In still another aspect of the invention, the housing supporting the pendulum and differential transformer may be substantially filled with oil for damping the oscillations of the pendulum.

The above, other objects and novel features of the invention will become apparent from the following specification and accompanying drawing which are merely exemplary.

In the drawing:

FIG. 1 is a front elevational view of a level to which the principles of the invention have been applied;

FIG. 2 is a partial sectional view taken substantially along line 2—2 of FIG. 1;

FIG. 3 is a view of a detail of the invention; and

FIG. 4 is a view of a modified form of the detail shown in FIG. 3.

Referring to the drawing, and particularly to FIG. 1, the principles of the invention are shown as applied to a level including a watt frame 10 having a rectangular configuration with pads 11, 12 and 13 at three of its four corners, the fourth corner also having such a pad, but which is not shown.

The pads 11 and 13 have aligned, accurately machined surfaces 14 and 15. The pads 11 and 12 have aligned, accurately machined surfaces 16 and 17. Surfaces 14, 16 are at exactly right angles to each other, and corresponding surfaces on pads 12 and 13 are also at right angles to each other. From the foregoing it is evident that the frame 10 can rest on a horizontal surface or be held against a vertical surface.

The frame 10 may comprise two parallel spaced walls 18 and 19 having a circular opening 20 extending through said walls. Lugs 21 and 22 may be located between walls 18 and 19 near the bottom of the circular opening 20, and they are provided with aligned, machined surfaces 23 and 24 that are parallel with the plane including surfaces 14 and 15.

A housing 25, which may be made of any metal such as cast iron or aluminum, may include ears 26 and 27 having their lower surfaces machined in aligned relation. Ears 26 and 27 support the housing 25 on the surfaces 23 and 24 of lugs 21 and 22. Screws 28 are employed to fasten housing 25 to lugs 21 and 22.

The housing 25 may have an open upper end that is closed by a cap member 29 that is supported by surface 30 machined parallel to the surfaces on the bottom of ears 26 and 27. Cap member 29 may support parallel depending, relatively rigid straps 31 and 32 of aluminum or other non-magnetic material to which a rectangular frame 33 is fixed at the bottom thereof.

Also depending from cap member 29 are relatively thin, flexible strips 34 and 35 which may be made of beryllium copper and having a thickness in the order of about 0.001 of an inch. The strips 34 and 35 support at their lower ends, by screws 35', a pendulum mass 36 of non-magnetic material including a portion 37 that extends through an opening 38 in frame 33. The clearance between the portion 37 and the walls of opening 38 is in the order of several thousandths of an inch.

A plate 39 may be attached to the portion 37 and it may overlap the sides of frame 33 and be spaced beneath said frame. In the event the level were turned over, plate 39 would engage the frame 33 and prevent the pendulum from damaging the thin strips 34 and 35.

Referring to FIGS. 1, 3 and 4, the strips 34, 35 may be of different configurations, i.e., they may be of uniform width as well as non-uniform width. The configuration of strip 34, as shown in FIG. 3, includes a recess 40 providing spaced legs 41, 42, and that of strip 35 is shown as comprising a single leg 43. A combination of these two on opposite sides of the pendulum mass 36 tends to ensure accurate readings even if the level is tilted transversely within limits.

Alternatively, both strips 34 and 35 may take the form shown in FIG. 4 wherein a V-shaped strip is disclosed. It is essential that the crotch of the V-shaped strips 34, 35 (FIG. 4) be connected to the mass 36 at its center of gravity. With the construction shown in FIG. 4, and with the level perfectly vertical, both legs of each V-strip 34, 35 equally divide the support of the pendulum mass 36 between them. Should the housing 25 be tilted transversely, to the right (FIG. 4), the righthand legs carry less weight until the angle of transverse tilt is equal to one-half of the included angle between the legs of the V, at which time the lefthand legs carry all of the weight of the pendulum mass 36.

Referring again to FIG. 1, a differential impedance device, which in the embodiment disclosed is shown as a differential transformer 44, is mounted on cap member 29 between strips 34 and 35. Transformer 44 includes a core 45 of laminated construction having legs 46 and 47 between which a central leg 48 is located. The two outer legs 46 and 47 are joined by legs 49 and 50, and an air gap 51 is provided between leg 48 and leg 49. The winding 52 on leg 48 is supplied with alternating voltage from an A.C. source 53 which may be a battery-operated oscillator. The windings on legs 46 and 47 are such that the outputs thereof buck each other, providing a signal proportional to the difference between the flux in legs 46 and 47.

A flux barrier 54 is provided. It may be made of any non-magnetic, electric current carrying material, and is shown as a ring surrounding leg 49 and fixed to the center of the pendulum mass 36. Accordingly, movement of the mass 36 varies the alternating magnetic flux in legs 46 and 47, the difference of which provides a signal that is fed to an amplifier 55, the output of which operates a meter 56 that indicates the magnitude of the amplified signal.

In order to dampen the response of the pendulum mass 36, the housing 25 may be filled with an oil of a viscosity best suited for the particular use to which the level will be put. The filling and emptying of housing 25 may be accomplished through a passage 57 that is closed by a closure 58. A fitting 59 may be provided on cap member 29 for the passage of the leads from the windings on the legs 46, 47 and 48.

Although the various features of the improved level have been shown and described in detail to fully disclose several embodiments of the invention, it will be evident that changes may be made in such details and certain features may be used without others without departing from the principles of the invention.

What is claimed is:

1. An electronic leveling instrument comprising a frame having a longitudinal axis and a reference surface adapted to be positioned against a surface the deviation of which from a datum plane is desired to be measured; a housing supported in said frame; a pendulum disposed in said housing; means for supporting said pendulum in said housing and permitting movement of said pendulum in the direction of said longitudinal axis; a differential impedance device mounted in said housing adjacent to, and in cooperative relation with, said pendulum, said device being adapted to produce an output signal in response to longitudinal movements of said pendulum on either side of a null position corresponding to the true vertical position of the pendulum; and means connected to said pendulum for varying the signal produced by said impedance device upon longitudinal movement of said pendulum from said true vertical position, said pendulum supporting means comprising a pair of flat, flexible, V-shaped members attached to an upper portion of said housing and depending therefrom in longitudinally spaced relation, said members having angularly intersecting legs of equal length with the spaced ends of said legs disposed upwardly and attached to said housing, said legs having an intersecting portion adjacent said pendulum and attached thereto along a longitudinal axis passing substantially through the center of gravity of said pendulum, whereby transverse tilting of said frame at angles less than one-half the included angle of said angularly intersecting legs has minimal effect on the longitudinal movement of said pendulum and the accuracy of said leveling instrument.

2. The leveling instrument set forth in claim 1 wherein said impedance device is a transformer having two alternative magnetic circuit paths, and said means connected to said pendulum is a flux barrier for varying the relative magnetic flux distribution in the two paths upon movement of said pendulum.

3. The leveling instrument set forth in claim 2 additionally including means for limiting the movement of said pendulum in said housing, and a liquid having a preselected viscosity disposed within said housing and surrounding said pendulum to dampen the movement thereof.

References Cited by the Examiner

UNITED STATES PATENTS

| 2,552,722 | 5/1951 | King | 33—206.5 X |
|---|---|---|---|
| 2,631,272 | 3/1953 | Smith | 264—1 |
| 2,744,335 | 5/1956 | Litman | 33—215.3 X |
| 2,928,183 | 3/1960 | Adams | 33—206.5 |
| 3,083,469 | 4/1963 | Herbst | 33—206.5 X |

FOREIGN PATENTS 934,337   1/1948   France.

LEONARD FORMAN, *Primary Examiner.*

WILLIAM D. MARTIN, Jr., *Assistant Examiner.*